C. E. WHITE.
PLANTING MECHANISM.
APPLICATION FILED AUG. 6, 1913.
1,236,028.
Patented Aug. 7, 1917.
2 SHEETS—SHEET 1.
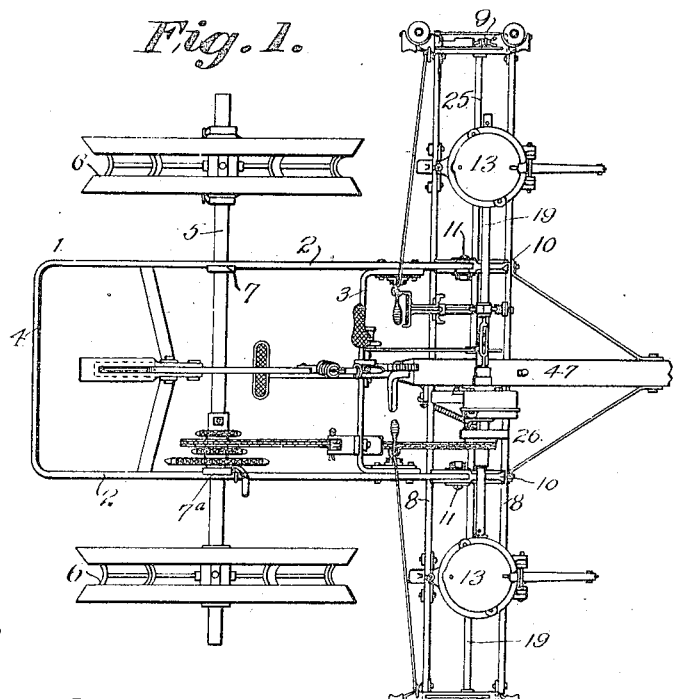
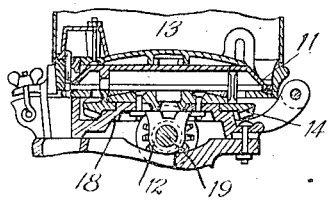
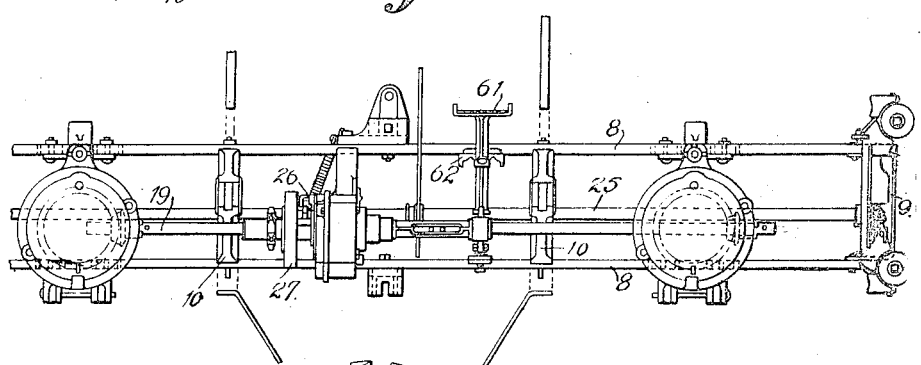
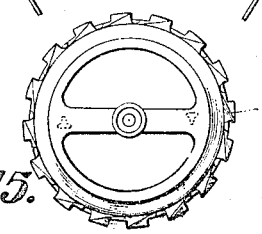
Witnesses:
H. H. Lybrand
S. Jay Teller
Inventor:
Charles E. White
By H. A. Bliss
Attorney

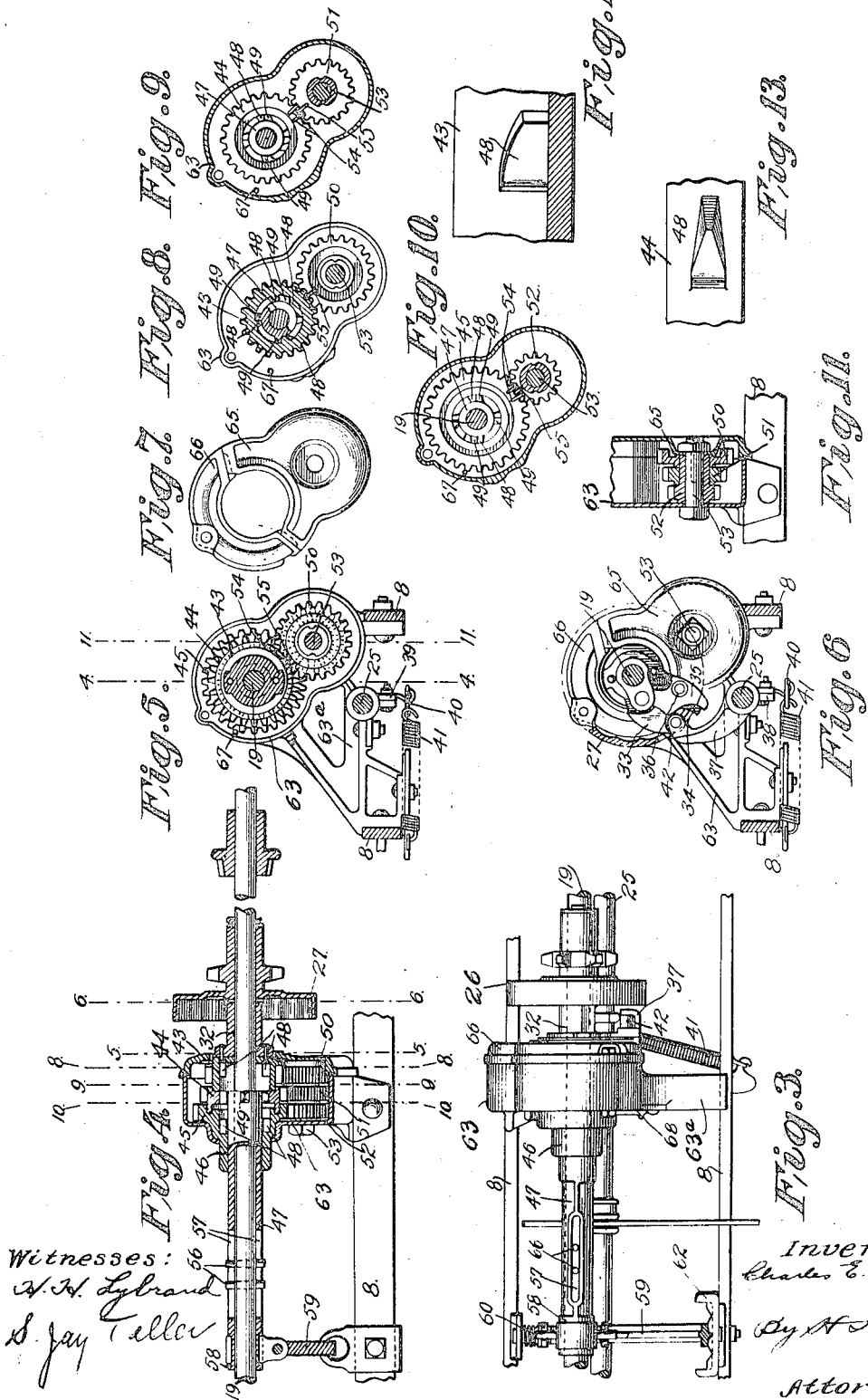

UNITED STATES PATENT OFFICE.

CHARLES E. WHITE, OF MOLINE, ILLINOIS, ASSIGNOR TO DEERE & MANSUR COMPANY, OF MOLINE, ILLINOIS, A CORPORATION OF ILLINOIS.

PLANTING MECHANISM.

1,236,028.  Specification of Letters Patent.  Patented Aug. 7, 1917.

Application filed August 6, 1913. Serial No. 783,441.

*To all whom it may concern:*

Be it known that I, CHARLES E. WHITE, a citizen of the United States, residing at Moline, in the county of Rock Island and State of Illinois, have invented certain new and useful Improvements in Planting Mechanisms, of which the following is a specification, reference being had therein to the accompanying drawing.

This invention relates to improvements in checkrow corn planters of the class in which each comprises, among other parts, a seeding mechanism adapted to deliver at a hill an optionally variable number of kernels, those constituting the said number being selected by the seeding mechanism one by one from a seed mass, together with a tappet actuated, clutch-controlled mechanism for imparting to the seed delivering devices intermitting cycles of movement; it pertains more particularly to improvements in the devices by which the number of kernels selected and delivered at any one of the said movements can be optionally varied.

Figure 1 is a plan view indicating the principal parts of a planter of this class and illustrating how the present improvements can be applied.

Fig. 2 is a plan view of the front frame or seeder frame on a larger scale.

Fig. 3 is a plan view on a still larger scale showing the clutch part of the power transmitting devices together with some of those adjacent.

Fig. 4 is a longitudinal vertical section of the parts in Fig. 3 taken on the plane of the line 4—4, in Fig. 5.

Fig. 5 is a transverse section of the parts in Fig. 4 taken on line 5—5.

Fig. 6 is a transverse section taken on the plane of the line 6—6 in Fig. 4.

Fig. 7 is a face view of the closing or cap parts of the gear casing.

Fig. 8 is a transverse section on the plane indicated by the line 8—8 of Fig. 4.

Fig. 9 is a transverse section on the plane indicated by the line 9—9, Fig. 4.

Fig. 10 is a transverse section on the plane indicated by the line 10—10, Fig. 4.

Fig. 11 is a vertical section on the plane of the line 11—11 in Fig. 5.

Figs. 12 and 13 show the details of the interior teeth in the drop-varying gears.

Fig. 14 is a vertical transverse section of one of the sets of seeding devices.

Fig. 15 is a plan view of one of the seeder plates adapted for use with the drop-varying devices.

I have presented more or less of a complete planter in the drawings, as well as details of the improved drop-varying devices in order that the arrangement of the latter can be readily understood both in their relation to the seeding mechanism, the driving mechanism, and the planter as an entirety.

1 indicates the main frame, 2, 2, its side bars, 3 a front cross bar and 4 a rear cross bar, the latter preferably integral with side bars 2. 5 is a main axle 6, 6 the ground wheels, and 7, 7ᵃ the bearing brackets for the axle. The front seeder frame has bars 8, 8 connected by check-heads 9, 9 and intermediate brackets 10, 10. The rear frame is pivoted to the front one by pivots 11 in brackets 10.

Ordinarily the two frames are adjustable by means of a lifting lever and locking devices which may be of any preferred sort, and although indicated in the drawings need not be described in detail.

The front frame carries the runners with seed tubes and the seeding mechanisms, indicated as entireties by 13. Each has a rotatable seed plate 11 with cells, each for a single kernel. The seed plates are rotated by gear wheels 14 driven by bevel pinions 12 on the seeder shaft 19. The seeder plates and the shaft 19 are driven from the axle through an interposed clutch indicated by 26. The latter comprises a continuously rotating element 27, actuated by the sprocket chain extending to the axle. The driven element 32 of the clutch is loosely mounted on the seeder shaft 19.

While I have shown in the drawings some of the details of a well known form of planter clutch it is to be understood that modification can be made so far as concerns this part of the apparatus. Description of all its details is not necessary. Suffice it to say:

35 is a spring pressed pawl pivoted to the part 32 and adjacent to cam 33. 36 is a roller on the pawl adapted to engage in notches in the part 27. When the pawl is so engaged power is transmitted from the driver 27 to the driven element 32. 25 is the ordinary rock shaft actuated by the tappets on the check-wire. 37 is an arm on this shaft with projections 38, 39. 40 is a link engaging the projections and 41 is a spring extending from the link to a frame fastening. The arm 37 has a roller 42 normally engaging the cam 33 and forcing the arm backward. When the cut-out or notch 34 is reached the spring forces the roller into it and at this time it engages the pawl 35 and disengages the roller 36 from a clutch-driver. But when the rockshaft is moved by the check-wire the roller 42 is disengaged from the pawl and the two parts of the clutch are engaged.

The clutch cycle is, in the machine shown, one complete revolution of the shaft 19, the cycle commencing with the action of a tappet on the check-wire and closing under the action of the spring 41, acting as above described.

Secured to the driven element 32 of the clutch is a spur gear 43 of relatively small diameter. 44 is a similar gear of larger diameter mounted in part on a flange on the gear 43. 45 is a gear of still larger diameter, having a hub 46 mounted on a sleeve 47 which surrounds the shaft and is longitudinally slidable with respect thereto. The gear 44 has a hub or flange which extends into and engages with the walls of a recess formed in the gear 45. The gears 43, 44 and 45 are provided with internal teeth or lugs 48, which are adapted to be engaged by projections or teeth 49 on the end of the sleeve 47. There are four of these teeth 49, and they are equally spaced.

50, 51 and 52 represent three pinions or gears rigidly secured together and mounted on a bolt or pin 53 to mesh with the gears 43, 44 and 45, respectively.

While the number of the teeth on the several gears can be varied, certain, definite proportions or ratios must be maintained. I prefer to provide the gears 43, 44 and 45 with twenty-one, twenty-four and twenty-eight teeth, respectively, and to provide the gears 50, 51 and 52 with twenty-one, eighteen and fourteen teeth, respectively. It is to be remembered that the gear 43 is driven through exactly one revolution at each actuation of the clutch, and it will be clear that with the numbers of teeth specified, the gear 44 will rotate through three-fourths of a revolution for each complete revolution of the gear 43 and the gear 45 through one-half of a revolution for each complete revolution of the gear 43. The before-mentioned internal driving teeth 48 on the gears 43, 44 and 45 are positioned 90 degrees apart, and it is obvious that the teeth of the several gears will come into alinement at the end of each clutch actuation.

In order to insure proper assembling of the gears to bring the internal teeth into alinement. I provide each of the gears, 43, 44 and 45 with indicators or marks 54, and the gears 50, 51 and 52 with indicators or marks 55. By bringing these indicators or marks into register with each other, proper alining of the internal teeth is insured.

It is obvious that by connecting one or another of the gears 43, 44 and 45 to the shaft 19, the speed of rotation of the shaft can be varied, or, in other words, the extent of rotation for each complete revolution of the clutch can be varied. In the construction shown, the shaft will rotate at the same speed and through the same distance as the driven element of the clutch when the gear 43 is connected; when the gear 44 is connected, it will be rotated through three-fourths of a revolution, and when the gear 45 is connected, it will be rotated through one-half of a revolution.

The sleeve 47 is connected to the shaft 19 for rotation therewith, by means of pins 56, which extend through suitable slots 57. For moving the sleeve 47 there is provided a collar 58, which is held between two flanges and which is provided with horizontal trunnions. These trunnions are engaged by the forks of a bifurcated arm 59. The arm is provided at its lower end with means for loosely pivoting it on suitable bearings on the front frame. The arm with its support can be moved in its bearings longitudinally of the machine and a spring 60 serves to normally hold it in its rearmost position. At the rear end of the support for the arm there is an upward extending foot lever 61, which is provided with a lug adapted to enter V-shaped notches in a bracket 62. The spring tends to force the lug into one or another of these notches and to thus lock the arm and the sleeve against movement. The operator can, however, by pressing on the lever with his foot, release the arm and adjust it to move the sleeve to one or another of its several operative position.

There are four of the internal driving teeth 48 on each of the gears 43, 44 and 45. Preferably, though not necessarily, one of the teeth on each gear is made considerably wider circumferentially than the others, so that there is provided between its rear edge and the next tooth a space only a little larger than is necessary to receive a tooth 49 on the sleeve 47. Both sides of the wide tooth on the center gear 44 are beveled inward toward the rear, as shown in Fig. 13. The wide teeth on the gears 43 and 45 are beveled inward toward the rear on the sides which are toward the center gear. The wide tooth for the gear 43 is shown in Fig. 12. The principal function of these wide teeth is to prevent any overrunning of the shaft and attached parts on account of inertia. It is obvious that the rear edge of the wide tooth will engage a tooth 49 and thus positively lock the sleeve shaft and the attached parts against continued movement due to inertia.

The teeth are beveled toward the rear, as described, in order to assist in the shifting of the sleeve and the attached teeth 49. Obviously, if the wide tooth were of the same thickness throughout, there could be but a small space into which the proper tooth 49 would enter, and with the parts rapidly moving, there might be a failure to obtain proper arrangement.

63ª indicates a bracket secured to the bars 8, 8 of the front frame. It is provided with a casing which incloses the gearing just described and gives them support. This casing is made with a relatively deep box 63 and cap plates 65, 66 for closing. The shaft 19 passes through the upper part of it, the sleeve 47 passing through the box part and through the hub 46 of wheel 45, while the sleeve 32 and the prime gear wheel 43 are near, and fitted close, to the cap parts 65 and 66 of the casing. In the lower part of the casing is supported the counter shaft 53 upon which the gears 50, 51 and 52 are mounted. The wheel 52 has a sleeve hub to the outer surface of which the wheels 50 and 51 are splined. The splines permit them to be readily separated axially and at the same time lock them together. The lower cap plate 65 is counter-sunk so that the nut on the shaft pin 53 can be seated in a cavity, leaving an entirely free space, in planes transversely of the shaft, for the rotation of the clutch elements. The wheels 50, 51 and 52 can be otherwise mounted, but it will be seen that they are in a chamber which is practically entirely lubricant tight, the shaft pin 53 being non-rotary, and therefore permitting its being fitted tightly in the apertures in the casing.

Heretofore much trouble has been experienced with gear variables of this class because of a number of matters. There being a large number of constantly meshing gear teeth on small wheels there is liability of cramping and binding. I obviate this by employing a gearing-supporter and container of such nature as to hold the gears permanently in rigid working relation. The axis of the shaft pin 53 is held constantly in true parallelism with the axis of the gear wheels 43, 44, 45, the wheel 45 being fitted tightly in the casing wall and those at 44 and 43 being in turn fitted to it, and therefore all held in true mesh relationship with the wheels on the shaft pin 53, and also held tightly in the casing.

Another disadvantage has been the difficulty experienced in assembling the numerous small parts at the time of erecting the machine and doing so in such way as to attain the necessary nicety of fitting. When the parts are designed and related in the way shown and described the assembling of them with the utmost accuracy is rapidly accomplished. Prior to putting the shaft 19 in place it is held upright, endwise, with the casing open, and opening upward. The wheels 45, 44 and 43 are rapidly slipped into their proper relative positions, a set of wheels 52, 51 and 50 are similarly inserted, the shaft pin 53 is passed through the latter and fastened in place, the entire casing is then filled with stiff lubricant and the closing caps 65 and 66 are quickly fastened tightly either by rivets or bolts. The edges of the casing box and cap pieces 65, 66 are tongued and grooved, or similarly tightly fitted, or sealed with lead paint. The tightness of the casing (without any cramping or binding on the gear) is so great that a single filling of lubricant will last for many years. The entrance of sand, grit or foreign material to the small teeth of the gear wheels is practically absolutely overcome. However, if preferred, a passage can be left at 67 for the introduction of lubricant and use may be made of a movable closure, as at 68.

The manner of operating a planting mechanism constructed with the parts described will be readily understood. A check-row wire with tappets is first properly stretched across the field, and placed so as to be supported on and move along one of the check-heads 9. The tappets successively engage the forks and impart quick rocking movements to the shaft 25. Each of these movements withdraws the arm 37 and permits the spring dog to thrust its roller 36 into engagement with the continuously rotating driving element 27. Thereupon the driven element 32 and the prime gear wheel 43 are carried around through one clutch cycle. If the sleeve 47 is set so that its teeth 49 engage with the teeth 48 on this wheel 43 this complete clutch cycle becomes a complete revolution of the shaft 19. This causes the pinions 12 to give one-fourth of a revolution to the seed plates 11. Four cells of each plate travel to the delivery point and drop four kernels.

When the sleeve is set to have its teeth 49 engage with wheel 44 the shaft will be rotated through three-fourths of a revolution and three kernels will be discharged. When the gear 45 is connected by the teeth 49 and the sleeve 47 to the shaft it will be rotated through only one-half of a revolution and two kernels will be delivered.

The operator, therefore, by merely moving the foot-lever 61, and adjusting the sleeve 47, can set the parts so as to plant four, three or two kernels, as desired.

The foot-lever can be shifted at any time and the peculiarly constructed teeth or lugs on the gears 43, 44 and 45 insure that the sleeve will come accurately into a new position where it will be operated and will secure the desired results in the planting. This maintaining of the interior teeth of the wheels 43, 44, 45 in the proper alinement in which they stand at the termination of a normal movement of the parts is further insured by the peculiar mounting and connecting up of the wheel 43.

The eight wheels of this train are locked together and the wheel 43 controls the position of all of them. It, in turn, is locked to the frame the instant the seeding mechanism ceases one of its normal actions. It is rigid with the rotary sleeve 32 which, through the parts at 33, 35 and 37, is held from accidental rotation. Therefore, the seed plate is held practically rigid during the intervals intervening between its normal movements, the teeth 48 in one of the wheels (43, 44, 45) are held in axial alinement with the corresponding teeth on each of the two other wheels and the sleeve 47, with its teeth 49, can be quickly and easily moved without impediment from one position to another, and without forcing the seed plate 11 into any erroneous position.

In drop-varying mechanisms of this class, as heretofore made, the three wheels corresponding to those at 43, 44, 45 have been all, throughout the series, normally loose and unlocked in relation to each other or in relation to the other parts of the machine.
Not only is the chamber or space around the three pair of meshing gear mates made lubricant-tight by the casing box, as above described, but the chamber in the interiors of the wheels 43, 44 and 45 is also lubricant-tight as the said wheels are so arranged that the edge of one fits tightly in a groove in, or against a shoulder on, its neighbor, and practically lubricant-tight joints are provided to prevent the escape inward of the lubricant which is contained in the outer chamber. The adjustable device for connecting the drive wheels alternately with the seeder shaft is in this interior chamber and can be moved back and forth with assurance against the escape of lubricant.

This interlocking of the wheels 43, 44, and 45 together with the elongated seating of the wheel 45 in the wall of the casing box provides a support or mounting for the wheels of the upper series more or less independent of the seeder shaft which passes through the casing; and the axes of the two series of wheels are maintained parallel notwithstanding slight displacements of the shaft that may be caused by jolting or jarring when the machine is in motion, and cramping and binding of the numerous small intermeshing wheels are obviated. The intermediate wheel 44 gets its support and bearing entirely on the adjacent wheels 43 and 45, the former carried by a loose sleeve (as at 32) on the shaft, and the latter, 45, being similarly loosely mounted on the sleeve 45 interposed between it and the shaft.

What I claim is:

1. In a corn planter, the combination of the supporting frame, an intermittingly acting seeder mechanism adapted at each of its operations to deliver at will either of a predetermined variable number of seeds one at a time, a shaft mounted on said frame for imparting optionally variable movements to the seeder mechanism, a lubricant-tight casing box independently mounted on said frame, a series of differently speeded driving wheels in the casing box, a chamber surrounded by said wheels and having lubricant-tight inclosing walls, means in said chamber for connecting the shaft at will with either of the differently speeded driving wheels, and power transmitting means in the casing box for actuating the shaft-driving wheels with different speeds.

2. In a corn planter, the combination with the seed-carrying and delivering mechanism, the shaft for actuating said mechanism, a tappet actuated clutch moving intermittingly through equal predetermined distances, a series of gears mounted on the shaft, a countershaft, a series of gears mounted on the countershaft and meshing respectively with the gears of the first series, one of the gears of one series being connected to the driven element of the clutch and all of the gears of one series being rotatable independently of each other and of their shaft, a longitudinally slidable sleeve interposed between the gears of the last said series and the corresponding shaft, the sleeve being connected to the shaft for rotation therewith, teeth on the sleeve, and teeth on each of the gears spaced similarly to the teeth on the sleeve, one of the said teeth being of such a width that its rear edge lies close to the front edge of the corresponding tooth on the sleeve, whereby continued movement of the sleeve and attached parts on account of inertia is prevented.

3. In a corn planter, the combination of two seed separating and depositing mechanisms, a transverse shaft connected with the said mechanisms for driving them, a clutch having its driving element connected to the planter axle, the said clutch being constructed to be automatically released after revolution through a definite angle, a series of gears mounted on the shaft, a countershaft, a series of gears mounted on the countershaft and meshing respectively with the gears of the first series, one of the gears of one series being connected to the driven element of the clutch and all of the gears of one series being rotatable independently of each other and of their shaft, a longitudinally slidable sleeve interposed between the gears of the last said series and the corresponding shaft, the sleeve being connected to the shaft for rotation therewith, teeth on the sleeve, and teeth on each of the gears spaced similarly to the teeth on the sleeve, one of the said teeth being of such a width that its rear edge lies close to the front edge of the corresponding tooth on the sleeve, whereby continued movement of the sleeve and attached parts on account of inertia is prevented, the said wide teeth on the several gears being beveled toward the rear, whereby engagement of the teeth on the sleeve is facilitated.

In testimony whereof, I affix my signature, in presence of two witnesses.

CHARLES E. WHITE.

Witnesses:
 BAILEY W. AVERY,
 JOHN W. DAY.